United States Patent [19]
Hung et al.

[11] Patent Number: 5,550,191
[45] Date of Patent: Aug. 27, 1996

[54] CATALYST FOR REACTIVE HOT MELT ADHESIVES

[75] Inventors: Ju M. Hung, Yardley, Pa.; Malcolm Graham, Bushey, United Kingdom

[73] Assignee: National Starch and Chemical Investment Holding Corporation, Wilmington, Del.

[21] Appl. No.: 428,594

[22] Filed: Apr. 25, 1995

Related U.S. Application Data

[63] Continuation of Ser. No. 200,131, Feb. 22, 1994, abandoned.

[51] Int. Cl.$^6$ .......................... C09J 175/04; C09J 175/14
[52] U.S. Cl. ...................... 525/92 C; 525/127; 525/453; 525/455; 528/53
[58] Field of Search ......................... 528/53; 525/92 C, 525/453, 127, 455

[56] References Cited

U.S. PATENT DOCUMENTS

| | | | |
|---|---|---|---|
| 3,645,925 | 2/1972 | Speranza | 521/115 |
| 3,931,077 | 1/1976 | Uchigaki et al. | 260/26 |
| 4,758,648 | 7/1988 | Rizk | 528/53 |
| 4,775,719 | 10/1988 | Markevka et al. | 525/125 |
| 4,808,255 | 2/1989 | Markevka et al. | 156/307.3 |
| 4,820,368 | 4/1989 | Markevka et al. | 156/307.3 |
| 4,891,269 | 1/1990 | Markevka et al. | 428/423 |
| 5,021,507 | 6/1991 | Stanley et al. | 525/127 |
| 5,075,386 | 12/1991 | Vanderbilt | 525/327.3 |
| 5,130,404 | 7/1992 | Freeland | 528/52 |
| 5,189,073 | 2/1993 | Humbert et al. | 521/110 |

FOREIGN PATENT DOCUMENTS

| | | |
|---|---|---|
| 0086621 | 8/1983 | European Pat. Off. |
| 0246473 | 11/1987 | European Pat. Off. |
| 0264675 | 4/1988 | European Pat. Off. |
| 0532765A1 | 3/1993 | European Pat. Off. |
| 0532765 | 3/1993 | European Pat. Off. |
| 0632077 | 1/1995 | European Pat. Off. |
| 6639478 | 6/1966 | Japan. |
| 6639479 | 6/1966 | Japan. |
| 6676830 | 11/1966 | Japan. |
| 5-117619 | 5/1993 | Japan. |
| WO86/01397 | 3/1986 | WIPO. |

OTHER PUBLICATIONS

"Texacat®DMDEE Catalyst", Texaco Chemical Company, Technical Bulletin, 1988.
"PUR Technology Offers Expanded Application Opportunities", Philip A. Souze, *Adhesives Age*, Aug. 1993, pp. 20–23.

*Primary Examiner*—Patricia A. Short
*Attorney, Agent, or Firm*—Ellen T. Dec

[57] ABSTRACT

A catalyzed polyurethane reactive hot melt adhesive is prepared from a reactive polyurethane prepolymer and 0.05 to 0.6% by weight of a 2,2'dimorpholinoethyl ether or di(2,6-dimethylmorpholinoethyl)ether catalyst. The adhesive is characterized by improved curing speed with little or no effect on the thermal stability.

12 Claims, No Drawings

CATALYST FOR REACTIVE HOT MELT ADHESIVES

This application is a continuation of application Ser. No. 08/200,131, filed Feb. 22, 1994, now abandoned.

BACKGROUND OF THE INVENTION

Reactive hot melts are one-component, 100% solid, solvent-free urethane prepolymers. Unlike conventional hot melts that can be repeatedly heated from its solid state and flowed to a liquid form, the reactive hot melt behaves as a thermoset and goes through an irreversible chemical reaction once dispensed in the presence of ambient moisture.

The reactive hot melts are isocyanate terminated prepolymers that react with surface or ambient moisture in order to chain-extend, forming a new polyurethane polymer which offers performance superior to that obtained with conventional hot melt.

These reactive hot melts will bond to a variety of substrates including plastics, woods, fabrics and some metals making them ideal candidates for bonding dissimilar substrates. Moreover, they are flexible and durable by nature, so they may be used in extreme temperature ranges of −30° to +150° C. while providing excellent moisture and chemical resistance.

While recent progress has been made to improve the green strength and other properties of these adhesives, there remains a need to improve their curing speed. Catalysts have often been employed for this purpose; however, not without sacrifice of other properties. Thus, organo tin and bismuth catalysts such as dibutyl tin dilaurate are known to boost the curing speed of reactive polyurethane hot melts but the use thereof is accompanied by a reduction in thermal stability. Amine catalysts such as ethylene diamine have provided better thermal stability but are not as effective catalysts.

Therefore, there remains a need for a catalyst which will improve the curing speed of reactive hot melt adhesives without significantly reducing the thermal stability.

SUMMARY OF THE INVENTION

The curing speed of polyurethane reactive hot melt adhesives may be significantly improved with little or no effect on thermal stability by the use of a catalyst containing both ether and morpholine functional groups. Thus, the hot melt systems of the present invention cure at substantially higher rates in the presence of water, but are not accompanied by undesirable increases in viscosity or melt instability in the absence of moisture.

Thus, the present invention is directed to a catalyzed polyurethane reactive hot melt adhesive comprising:

a) a reactive polyurethane adhesive and b) 0.05 to 0.6% to by weight of a 2,2'-dimorpholinoethyl ether or di(2,6dimethylmorpholinoethyl)ether catalyst.

The invention is also directed to a process for improving the curing speed of a reactive polyurethane hot melt adhesive by the incorporation therein of an effective amount of the ether and morpholine containing catalyst.

DETAILED DESCRIPTION PREFERRED EMBODIMENTS

The ether and morpholine containing catalyst is useful herein 2,2'dimorpholinoethyl ether or di(2,6-dimethylmorpholinoethyl)ether represented by the following formulas 1 and 2:

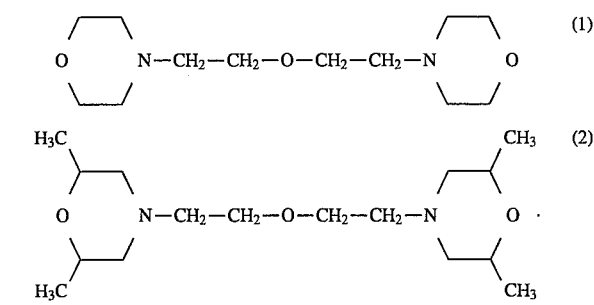

A representative commercially available catalyst of formula 1 is Texacat DMDEE from Texaco and that of formula 2 is available as U-CAT 2041 from Sanapuro Co. The catalysts are used in effective amounts, i.e., an amount sufficient to catalyze the reaction. Generally, these amounts vary within the range of 0.05 to 0.6% by weight, preferably 0.075 to 0.125%, most preferably about 0.1%. The optimum amount depends upon the isocyanate content of the prepolymer as well as the temperature and moisture in the invention.

While the catalyst described herein may be used for any polyurethane reactive hot melt adhesive, if finds particular application in polyurethane reactive hot melts containing residual ethylenic unsaturation or those urethane prepolymer compositions containing a thermoplastic polymer selected from the group consisting of an A-B-A block copolymer, an A-(B-A)$_n$-B block copolymer, and a radial A-B-A block copolymer wherein n is an integer from about 2–50, each A is a polystyrene block and each B is a rubbery block.

Thus, the first and preferred class of hot melts for use herein are prepared by the incorporation in the urethane prepolymer of a low molecular weight polymer. The low molecular weight polymer may be added to a polyol component prior to reaction with the isocyanate components or it may be added to the already formed prepolymer. Suitable adhesives may also be formed through the simultaneous polymerization of the urethane prepolymer and the ethylenically unsaturated monomers. The polyurethane prepolymer may also be polymerized in the ethylenically unsaturated monomers, which are then subsequently polymerized to form the adhesive. Alternatively, if a polyol is used to form the prepolymer, the ethylenically unsaturated monomers may be polymerized in the polyol using free radical polymerization procedures. In this case, the isocyanate components are subsequently polymerized with the mixture using conventional condensation polymerization procedures. This latter polymerization procedure has the advantage of excellent control of the molecular weight of the resulting vinyl polymer (as determined by intrinsic viscosity) and also produces a polymer which is free of detrimental impurities. In addition, the reduction in the handling and inventory of materials and elimination of intermediate packaging and storage bring about significant cost savings.

In the specific embodiment wherein an ethylenically unsaturated monomer containing moisture reactive functional groups is employed, the reactive nature of the crosslinking monomer requires that the monomer be added after the prepolymer has been formed. Thus, in this embodiment, the (co)polymer may be added in its polymerized form to the already formed prepolymer. Alternatively, and more preferably, the monomer or monomers are added to the already formed polyurethane prepolymer and polymerized therein using free radical polymerization procedures.

Any ethylenically unsaturated monomer capable of free radical polymerization and which does not contain active hydrogen may be used herein. Most commonly employed are the $C_1$ to $C_{12}$ esters of acrylic and methacrylic acids including, but not limited to methyl acrylate, ethyl acrylate, n-butyl acrylate, isobutyl acrylate, n-propyl or iso-propyl acrylate as well as the corresponding methacrylates. Mixtures of compatible (meth)acrylate monomers may also be used. Such mixtures, including mixtures of butyl and methyl methacrylate are well known in the art. Additional ethylenically unsaturated monomers such as vinyl esters (e.g., vinyl acetate and vinyl propionate), vinyl ethers, fumarates, maleates, styrene, acrylonitrile, ethylene, vinyl ethers, etc., may be used as may comonomers thereof.

When the ethylenically unsaturated monomer contains moisture reactive functional groups, any such monomer containing moisture reactive (curable) functional groups may be employed. In particular, monomers containing silane or reactive isocyanate functionality are particularly useful herein.

Typical of useful silane or isocyanate containing ethylenically unsaturated copolymers are those which contain only mers derived from an ethylenically unsaturated monomer containing silane or isocyanate functional groups of those which contain up to 99% by weight of mers derived from a non-silane or non-isocyanate containing ethylenically unsaturated monomer capable of free radical polymerization. Thus, the final ethylenically unsaturated silane or isocyanate containing copolymer may contain 1 to 100% of the polymerized ethylenically unsaturated silane or isocyanate monomer, preferably up to 50% by weight and more preferably (from an economic standpoint) 5 to 30% by weight. Indeed, levels of ethylenically unsaturated silane or isocyanate containing monomers in the range of 15% or less have been shown to provide potentially commercially significant results.

The ethylenically unsaturated silanes are preferably those which will participate directly in the reaction by free-radical polymerization and which do not contain active hydrogen. Representative commercially available silanes of this type include vinyltrichlorosilane, vinyltriethoxysilane, vinyltrimethoxysilane, vinyltris(2-methoxyethoxy)silane, 3-methacryloxypropyltrimethoxysilane, 3-methacryloxypropyltris(2-methoxyethoxy)silane, vinyltriacetoxysilane, 4-(3-trimethethoxysilylpropyl-benzylstyrene sulfonate, 3-acryloxypropyltrimethoxysilane, allyltriethoxysilane, allyltrimethoxysilane, vinylmethyldiethoxysilane, vinyldi-methylethoxysilane, vinylmethyldiacetoxysilane, 3-methyacryloxypropylmethyl-diethoxysilane, 3-acryloxypropyldimethylmethoxysilane, etc.

The ethylenically unsaturated isocyanates are also preferably those which will participate directly in this reaction by free-radical polymerization and which do not contain active hydrogen. Representative commercially available isocyanates of this type include isocyanatoethyl methacrylate and m-isopropenyl-γ,γ-dimethylbenzyl isocyanate.

As discussed above, any ethylenically unsaturated monomer capable of free radical polymerization and which does not contain active hydrogen may be employed as a comonomer in forming the final silane or isocyanate containing copolymer. Most commonly employed are the $C_1$ to $C_{12}$ esters of acrylic and methacrylic acids including, but not limited to methyl acrylate, ethyl acrylate, n-butyl acrylate, isobutyl acrylate, n-propyl or iso-propyl acrylate as well as the corresponding methacrylates. Mixtures of compatible (meth-)acrylate monomers may also be used. Such mixtures, including mixtures of butyl and methyl methacrylate are well known in the art. Additional ethylenically unsaturated monomers such as vinyl esters (e.g., vinyl acetate and vinyl propionate), vinyl ethers, fumarates, maleates, styrene, acrylonitrile, ethylene, vinyl ethers, etc., may be used as may copolymers thereof. Typical adhesives of this class are described, for example, in U.S. Pat. No. 5,021,507 to Stanley, et al.

The urethane prepolymers are those conventionally used in the production of polyurethane hot melt adhesive compositions. Most commonly, the prepolymer is prepared by the condensation polymerization of a polyisocyanate with a polyol, most preferably the polymerization of a diisocyanate with a diol. The polyols used include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol In addition, the urethane prepolymers may be prepared by the reaction of a polyisocyanate with a polyamino or a polymercapto-containing compound such as diamino polypropylene glycol or diamino polyethylene glycol or polythioethers such as the condensation products of thiodiglycol either alone or in combination with other glycols such as ethylene glycol, 1,2-propylene glycol or with other polyhydroxy compounds disclosed above. Also, small amounts of low molecular weight dihydroxy, diamino, or amino hydroxy compounds may be used such as saturated and unsaturated glycols, e.g., ethylene glycol or condensates thereof such as diethylene glycol, triethylene glycol, and the like; ethylene diamine, hexamethylene diamine and the like; ethanolamine, propanolamine, N-methyldiethanolamine and the like.

Any suitable organic polyisocyanate may be used such as, for example, ethylene diisocyanate, ethylidene diisocyanate, propylene diisocyanate, butylene diisocyanate, hexamethylene diisocyanate, toluene diisocyanate, cyclopentylene-1,3,-diisocyanate, cyclohexylene-1,4-diisocyanate, cyclohexylene-1,2-diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate,azobenzene-4,4'-diisocyanate,diphenylsulphone-4,4'-diisocyanate, dichlorohexamethylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene, 4,4'-dimethyldiphenylmethane-2,2',5,5-tetraisocyanate, and the like.

The polyisocyanate and polyol, polyamino or polymercapto components are combined in proportions so as to yield a urethane prepolymer characterized by an isocyanate content of from about 0.25 to about 15%, preferably to about 10%, and most preferably from 1.5 to 5%. In addition, the ratio of isocyanate equivalents to hydroxyl, amino or mercapto equivalents (known as the isocyanate index) should be greater than 1 but no more than about 2. By maintaining the low isocyanate index, we are able to reduce the level of free isocyanate content in the final hot melt adhesive composition to less than about 4%, preferably less than 1%. It will be recognized that the presence of higher levels of free isocyanate has a detrimental effect on a hot melt formulation since it causes toxic fumes to be released when the adhesive is heated to application temperature. The higher levels of free isocyanate may also cause reduction in viscosity and poorer initial bond strength of the adhesive. The precise amount of the polyisocyanate used in the polymerization will depend on the equivalent weight and amount of the non-isocyanate components, and the particular polyisocyanate employed. In general, the amount of the polyisocyanate needed to achieve the isocyanate content will vary from about 5 to about 55% of the final prepolymer.

In the broadest sense, the ethylenically unsaturated monomer may be polymerized using conventional free radical polymerization procedures to a relatively low molecular weight. For purposes of clarification herein, by "low molecular weight" we mean weight average molecular weights in the range of approximately 10,000 to 30,000. The low molecular weight is obtained by careful monitoring and controlling the reaction conditions and, generally, by carrying out the reaction in the presence of a chain transfer agent such as dodecyl mercaptan. There is a recognized correlation between intrinsic viscosity and molecular weight and we have found that, in general, monomers polymerized to an intrinsic viscosity of 0.1 to 0.4 (I.V. as measured in a 9:1 mixture of tetrahydrofuran and alcohol) are particularly preferred for use herein. In this embodiment, the low molecular weight polymer is then blended either with the polyol and dissolved therein prior to reaction with the isocyanate component or the low molecular weight polymer is dissolved in the already formed urethane prepolymer. In the case of polyamino or polymercapto containing prepolymers, in-situ vinylic polymerization must be performed only in the pre-formed prepolymer. In either case, low molecular weight polymer is combined with the isocyanate terminated urethane prepolymer in a proportion such that the reactive curing hot melt adhesive contains about 5 to 90% of the urethane prepolymer and 95% to 10% of the low molecular weight polymer. Care should be taken in storing and handling the low molecular weight polymer to avoid contamination with ambient moisture or other factors which might affect the stability of the prepolymer system.

In accordance with an alternate method for preparing the urethane prepolymers, where the ethylenically unsaturated monomers do not contain reactive functional groups, and wherein a polyol is employed, the monomers are combined in an amount of about 2 to 90% by weight with 10 to 98% by weight of the polyol and polymerized therein using conventional free radical polymerization procedures in the presence of a chain transfer agent such as dodecyl mercaptan to achieve the low molecular weight polymer dissolved in the polyol. Subsequent to the polymerization of the ethylenically unsaturated monomer(s), the polyisocyanate and any additional ingredients required for the urethane prepolymer forming reaction are added and that reaction is carried out using conventional condensation polymerization procedures. In this manner, the resultant isocyanate terminated urethane prepolymer forms the reactive curing hot melt adhesive described above which contains about 5 to 90% of the urethane prepolymer and 95 to 10% of the low molecular weight polymer.

It is also possible in the case of monomers which do not contain isocyanate reactive functional groups to polymerize the low molecular weight polymer in the presence of the already formed isocyanate terminated urethane prepolymer. This method has the drawback of subjecting the prepolymer to unnecessary heating during the acrylic polymerization, heating that might result in branching, viscosity increase, depletion of needed isocyanate groups and possible gellation. Although these disadvantages are subject to control, more stringent control of conditions are required as compared to polymerization in the non-isocyanate functional urethane components. When the reaction is run in the polyol or other non-isocyanate containing component, there is also the advantage of lower reaction viscosities and reduced exposure to isocyanate vapors because of the lesser amount of heating required.

The second class of reactive urethane adhesives used herein are those prepared by the incorporation in the urethane prepolymer of about 1 to 200 parts by weight per each 100 part of the prepolymer of a thermoplastic polymer selected from the group consisting of an A-B-A block copolymer, an A-(B-A-)$_n$-B block copolymer, and a radial A-B-A block copolymer wherein n is an integer from about 2–50, each A is a polystrene block and each B is a rubbery block. Typical adhesives of this class are described in U.S. Pat. No. 4,820,368 to Markwka, et al.

While the adhesives may be used directly as described above, if desired the adhesives of the present invention may also be formulated with conventional additives such as plasticizers, compatible tackifiers, anti-oxidants, pigments, stabilizers and the like.

As discussed above, the morpholine and ether containing catalyst is used in an effective amount, generally about 0.05 to 0.6% by weight of the adhesive. It is incorporated into the adhesive by blending or addition in the absence of moisture, as by use of a nitrogen blanket. The catalyst may be post-added after preparation of the reactive urethane hot melt adhesive or, alternatively, the catalyst may be added before or during the prepolymer preparation since it will not catalyze the OH:NCO reaction.

The resulting hot melt adhesive compositions, as described herein above, are typically applied at temperatures of from about 120° F. and a corresponding melt viscosity of from about 3,000 to 50,000 centipoises.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

The following example illustrates the preparation of an adhesive composition for use herein.

Elvacite 2013 is a 64% butylmethacrylate/36% methylmethacrylate copolymer of I.V. 0.2 available from DuPont. The Elvacite was vacuum dried in a desiccator for 24 hours immediately prior to use herein.

| Ingredients: | |
|---|---|
| Polypropylene Glycol (1000 Mol. wt.) | 472. gm |
| 1,6-hexanediol neopentyl glycol adipate (2000 Mol. wt.) | 202.7 |
| Elvacite 2013 | 300.0 |
| Methylene bisphenyl diisocyanate | 224.9 |

The polyols and the Elvacite 2013 were added to the vessel and heated to 100° C. until the Elvacite was dissolved. At that point the methylene bisphenyl diisocyanate was added, and the reaction was held at 100° C. for 3 hours. After the 3 hours at 100° C. the reaction was poured hot from the vessel. The samples had the following properties:

| Properties | |
|---|---|
| % Methylacrylate polymer | 25% |
| % Urethane prepolymer | 75% |
| % Isocyanate groups | 2.0% |
| Viscosity at 100° C. | 86,000 cps |
| Viscosity at 120° C. | 8,000 cps |
| Viscosity at room temp. | Solid |
| Intrinsic viscosity in THF/ETOH | 0.25 |
| Color | water white |
| Clarity | clear to very slightly hazy |
| Isocyanate Index | 1.6 |

An adhesive suitable for use herein may also be made by the following "in situ" polymerization procedure. In this case, a one liter reaction vessel was set up equipped with a condenser, gas inlet tube, slow addition tube, thermometer, stirrer, and provisions for heating/cooling. The ingredients of the reaction consisted of the following:

| | | |
|---|---|---|
| 1. | Polypropylene glycol (1,000 mol wt.) | 275.8 gm |
| 2. | 1,6-hexane diol, neopentyl glycol adipate (3,000 M.W.) | 88.9 gm |
| 3. | 1,6-hexane diol, neopentyl glycol adipate (1,000 M.W.) | 29.3 gm |
| 4. | Butyl methacrylate | 17.8 gm |
| 5. | Butyl methacrylate | 94.1 gm |
| 6. | Methyl methacrylate | 9.4 gm |
| 7. | Methyl methacrylate | 53.6 gm |
| 8. | Dodecy mercaptan | 0.68 gm |
| 9. | Benzoyl peroxide | 1.7 gm |
| 10. | Benzoyl peroxide | 0.6 gm |
| 11. | Methylene bis phenyl diisocyanate | 131.1 gm |

The reaction vessel was purged with dry nitrogen and a slow stream of dry nitrogen was bubbled subsurface throughout the reaction. Ingredients designated 1, 2, 3, 4, 6, 8 and 9 were added to the vessel and the temperature raised to 80° C. After ½ hour at 80° C. ingredients 5 and 7 were added uniformly over a period of 1 hour. The reaction was held at 80° C. for an additional 3 hours, at which time 10 was added. The reaction was held an additional 2 hours at 80° C. and 11 was added; then the temperature was raised to 100° C. and held for 3 hours. At this point a vacuum of 120 mm to 130 mm was applied to the vessel for 20 minutes to 30 minutes and the reaction poured hot from the flask.

| Properties | |
|---|---|
| % Methacrylate polymer | 25% |
| Ration of butyl methacrylate to methyl methacrylate | 64 to 36 |
| % Urethane prepolymer | 75% |
| % isocyanate groups | 1.9% |
| Viscosity at 100° C. | 64,000 cps |
| Viscosity at 120° C. | 25.250 cps |
| Viscosity at RT | Solid |
| Intrinsic Viscosity in tetrahydrofuran/ethanol = 9/1 | 0.18 |
| Color | water white to very slightly amber |
| Clarity | clear to very slightly hazy |
| Calculated urethane prepolymer mol. wt. | 3315 mol. wt |
| Isocyanate Index | 1.6 |

EXAMPLE 2

The adhesive prepared according to the first embodiment of Example I was catalyzed by adding, under nitrogen, 0.1% of Texacat DMDEE, 2,2'dimorpholinodiethyl ether. For comparison, three other groups of samples were catalyzed with comparable amounts of conventional organotin, organobismuth and amine catalysts as well as one sample containing no catalyst (control).

The samples were tested using the following procedures:

| | |
|---|---|
| Heat Stability | Tested in ambient air use a Brookfield Thermosel Viscometer |
| Curing Speed | 5 mil thickness of steel sheet and particle board were glued with 5 mil thickness of tested adhesives. |
| Lap Shear | The samples were pulled at the different period of time after materials had been prepared. Results are in pounds per square inch. |

The results of the testing are presented in Table I.

TABLE 1

| Catalyst | 5 min. | 30 min. | 1.0 hr. | 1.5 hr. | 2.0 hr. | 3.0 hr. | 24.0 hr. | 48.0 hr. |
|---|---|---|---|---|---|---|---|---|
| Control (none) | 8 | 80 | 80 | 80 | 92 | 120 | 310 | 300 |
| DMDEE | 14 | 200 | 265 | 265 | 300 | 250 | 255 | 250 |
| Organobismuth Coscat 83 (Cas Chem) | 16 | 118 | 175 | 205 | 296 | 275 | 300 | 310 |
| Organotin | | | | | | | | |
| Cotin 200 (Cas Chem) | 15 | 67 | 225 | 265 | 240 | 290 | 305 | 307 |
| Cotin 280 (Cas Chem) | 14 | 120 | 220 | 270 | 250 | 280 | 285 | 300 |
| MetaCure T-131 (Air Products) | 22 | 90 | 130 | 185 | 210 | 245 | 300 | 275 |
| Amine | | | | | | | | |
| Niax A-1 (Union Carbide) | 13 | 42 | 155 | 230 | 230 | 325 | 285 | 310 |
| Niax A-33 (Union Carbide) | 10 | 90 | 150 | 150 | 155 | 280 | 325 | 300 |
| AMI-Cure 33LV (Air Products) | 20 | 135 | 166 | 166 | 150 | 285 | 330 | 290 |

The lap test shear data presented in Table 1 shows that reactive hot melt urethane containing DMDEE developed significant strength within 30 minutes after the sample was prepared.

All of organo metal catalysts were very unstable in the heat stability test with most samples curing within 10 minutes at 250° F. under air. While the amine catalysts had better stability, the sample catalyst with Texacat DMDEE, had a stability comparable to that of the control at 250° F. for about 2.5 hours evaluation.

An additional heat aging study was performed to evaluate the use of the catalyzed adhesive of the invention for open air application such as bookbinding or roller coating.

About 100 g each of the adhesive of Example 1 with and without 0.1% of Texacat DMDEE was put in half pint can. Two samples were put in an oven at 250° F. without a lid to allow air directly to contact the tested material during heat aging evaluation. Viscosity of control and the catalyst adhesive were measured before heat aging and after heat aging for 6 hours and 24 hours. The results are shown below.

TABLE 2

| | Control | Catalyzed |
|---|---|---|
| Viscosity | 14,600 | 13,800 |
| Viscosity after 6 hr. heat aging | 18,300 | 17,300 |
| % increase | 25.3 | 25.4 |
| % increase/hr. | 4.2 | 4.2 |

TABLE 2-continued

|  | Control | Catalyzed |
| --- | --- | --- |
| % increase higher than control | — | — |
| Viscosity after 24 hr. heat aging | 28,800 | 32,000 |
| % increase | 97.3 | 131.9 |
| % increase/hr. | 4.1 | 5.5 |
| % higher than control | — | 11.1 |

Both samples had almost the same viscosity after the two cans were heated in an oven under air for six hours. The viscosity % increase rate of two samples with and without catalyst were identical for the first six hours heat aging test. However, after twenty-four hours heat treatment, both cans had skins on top. The material below the skin was removed to be measured and found out that the viscosity of the catalyzed adhesive was only 11.1% higher than that of control.

This test was repeated using a different sample of adhesive prepared as in the first embodiment of Example 1 with the following comparable results.

TABLE 3

|  | Control | Catalyst |
| --- | --- | --- |
| Viscosity | 6,725 | 7,200 |
| Viscosity (one hour) | 6,900 | 7,425 |
| % increase per hour | 2.6 | 3.1 |
| Viscosity (four hours) | 8,000 | 8,850 |
| % increase per hour | 4.9 | 5.7 |
| Viscosity (eight and half hours) | 8,450 | 9,375 |
| % increase per hour | 3.0 | 3.6 |
| Viscosity (twenty-four hours) | 10,950 | 12,500 |
| % increase per hour | 2.6 | 3.1 |
| % higher than control | — | 14.15 |

EXAMPLE 3

Different levels of Texacat DMDEE were added to the adhesive of the first embodiment of Example 1 to study the thermal stability and the curing rate.

Each tested sample was degassed before being studied for stability. Stability was studied using a Brookfield Thermosel viscometer at 250° F. for 2 hours. All hot melt samples containing 0.15% Texacat DMDEE showed very good stability. However, when 0.2% of catalyst was added into different batches of the hot melt adhesive, the stability results presented some batch-to-batch deviation.

For the curing speed test, 5 mil thickness steel samples (1"×3") and particle board were glued with 4 mil thickness of tested adhesives which contained different amounts of catalyst, Texacat DMDEE. The adhesive without catalyst was a control. The results of this study are shown in the table below.

TABLE 4

| Catalyst Conc. | 5 Min. | 30 Min. | 1.0 Hr. | 1.5 Hr. | 2.0 Hr. | 3.0 Hr. | 24.0 Hr. | 48.0 Hr. |
| --- | --- | --- | --- | --- | --- | --- | --- | --- |
| — | 13 | 68 | 60 | 60 | 144 | 160 | 350 | 290 |
| 0.05 | 71 | 64 | 94 | 70 | 180 | 190 | 245 | — |
| 0.10 | 60 | 128 | 188 | 200 | 225 | 335 | 340 | 320 |
| 0.15 | 75 | 126 | 235 | 290 | 295 | 300 | 300 | 280 |

As the results show, the addition of 0.05% catalyst provides a small increase in the lap shear strength. As the amount of catalyst is increased to 0.1 and 0.15%, the increased cured speed becomes more pronounced.

Based on the results of this test, it is believed that an optimum balance of stability and cure speed is obtained for this particular adhesive using about 0.1% catalyst. As noted previously, these optimum levels will vary depending upon a number of variables including the isocyanate content of the adhesive, the amount of ambient moisture as well as the temperature at which the cure is effected.

EXAMPLE 4

For comparative purposes, a series of catalysts available from Texaco were mixed in an amount of 1% by weight with the reactive polyurethane adhesive and evaluated at 250° F. with Brookfield Viscometer.

The formulations and tested results are shown in Table 5.

TABLE 5

|  | Control | A | B | C | D | E | F |
| --- | --- | --- | --- | --- | --- | --- | --- |
| Catalyst* | | NMM | ZR-70 | NEM | DMDEE | ZF-20 | PMDETA |
| Melt Viscosity (at 250° F.) | | | | | | | |
| Initial | 6,725 | 8,475 | 8,125 | 8,375 | 7,200 | 8,075 | 8,750 |
| One Hour | 6,900 | 9,125 | 9,400 | 8,975 | 7,425 | 8,575 | 9,425 |
| % Increase Per Hour | 2.6 | 8.0 | 15.7 | 7.2 | 3.1 | 6.2 | 7.7 |

*Texacat NMM = N-methylmorpholine
Texacat ZR-70 = 2-(2-dimethylaminoethoxy)ethanol
Texacat NEM = N-ethylmorpholine
Texacat DMDEE = 2,2'-dimorpholinodiethyl ether
Texacat ZF-20 = Bis - (2-dimethylaminioethyl) ether
Texacat PMDETA = Pentamethyl diethylenetriamine The test results indicate that Texacat DMDEE was the most heat stable catalyst in this study.

EXAMPLE 5

Additional catalyzed adhesives were prepared by blending the reactive urethane of the first embodiment of Example 1 with 0.1% of one of the following:

(A) di(2,6-dimethylmorpholino)ethyl]ether (U-CAT-2041 from Sanapuro Co.)

(B) tri[2-(2,6-dimethylmorpholine)ethyl]amine (U-CAT-2046)

(C) 2,2'dimorpholinoethyl ether (Texacat DMDEE)

(D) Control—no catalyst

The melt viscosity was measured with Brookfield Viscometer at 250° F. For curing rate studies, 5 mil thickness of steel sheet and particle board were glued with 5 mil thickness of tested adhesives. Lap shear samples were pulled at the different period of time after the materials had been prepared. The results are shown in Tables 6 and 7.

TABLE 6

| Catalyst | U-CAT 2041 | U-CAT 2046 | Texacat DMDEE | — |
|---|---|---|---|---|
| Viscosity (cps) | | | | |
| Initial | 6,525 | 6,550 | 6,475 | 6,250 |
| Two Hours | 6,925 | 7,075 | 6,925 | 6,000 |
| % increase/hr | 3.07 | 4.01 | 3.47 | 2.80 |

TABLE 7

| Catalyst | U-CAT 2041 | U-CAT 2046 | Texacat DMDEE | — |
|---|---|---|---|---|
| Viscosity (cps) | | | | |
| Initial | 6,450 | 6,925 | 6,525 | 6,825 |
| Two Hours | 6,975 | 7,700 | 7,000 | 7,200 |
| % increase/hr | 4.07 | 5.60 | 3.64 | 2.75 |

The results of these tests show the improved thermal stability obtained using the ether containing morpholine catalysts as opposed to similar catalysts containing amine functionality.

To evaluate the curing speed of the catalyst used in the present invention, the adhesives were glued steel sheet with the low and the medium humidity particle boards. Tested results were presented in Tables 8 and 9.

TABLE 8

| Catalyst | U-CAT 2041 | U-CAT 2046 | Texacat DMDEE | — |
|---|---|---|---|---|
| Bond Strength (psi) | | | | |
| 5 mins. | 69 | 16 | 21 | 24 |
| 30 mins. | 67 | 75 | 122 | 85 |
| 60 mins. | 110 | 106 | 116 | 100 |

TABLE 8-continued

| Catalyst | U-CAT 2041 | U-CAT 2046 | Texacat DMDEE | — |
|---|---|---|---|---|
| 1.5 hrs. | 108 | 88 | 156 | 88 |
| 2.0 hrs. | 100 | 90 | 134 | 84 |
| 3.0 hrs. | 132 | 114 | 150 | 100 |
| 24 hrs. | 425 | 410 | 410 | 210 |
| 72 hrs. | — | 435 | 465 | 275 |

TABLE 9

| Catalyst | U-CAT 2041 | U-CAT 2046 | Texacat DMDEE | — |
|---|---|---|---|---|
| Bond Strength (psi) | | | | |
| 5 mins. | 11 | 11 | 12 | 5 |
| 30 mins. | 114 | 115 | 120 | 53 |
| 60 mins. | 186 | 200 | 245 | 102 |
| 1.5 hrs. | 230 | 230 | 290 | 120 |
| 2.0 hrs. | 225 | 145 | 295 | 110 |
| 3.0 hrs. | 410 | 320 | 410 | 170 |
| 24 hrs. | 360 | 370 | 370 | 350 |
| 72 hrs. | 345 | 360 | 355 | 345 |

Samples with the catalyst showed much faster curing rate than control. In the low humidity system, the lap shear strength of catalyzed materials reached plateau within 24 hours cured. However, the strength of control was still low after 72 hours preparation. When the humidity of substrate was increased, the curing speed also was improved. The strength of catalyzed samples reached to maximum in 3 hours.

Tables 8 and 9 also show that the strength of adhesive catalyzed with Texacat DMDEE was slightly higher than that of U-CAT 2041. When the test was repeated using medium humidity substrates, and testing the lap shear 60 and 90 minutes after the adhesives were applied, again Texacat DMDEE showed the highest number after 60 minutes cure. After 90 minutes, the results indicated that the Texacat DMDEE and U-CAT 2041 catalyst adhesives were more efficient than U-CAT 2046.

TABLE 10

| Catalyst | U-CAT 2041 | U-CAT 2046 | Texacat DMDEE | — |
|---|---|---|---|---|
| Bond Strength (psi) | | | | |
| 60 mins. | 130.0 | 130.0 | 195.0 | 97.0 |
|  | 110.0 | 150.0 | 225.0 | 45.0 |
|  | 150.0 | 70.0 | 205.0 | 90.0 |
|  | 130.0 | 135.0 | 205.0 | 75.0 |
| Ave. | 130.0 ± 16.3 | 121.3 ± 35.2 | 207.5 ± 12.6 | 76.8 ± 23.1 |
| 90 mins. | 220.0 | 145.0 | 190.0 | 55.0 |
|  | 240.0 | 150.0 | 250.0 | 120.0 |
|  | 220.0 | 185.0 | 267.0 | 105.0 |
|  | 235.0 | 105.0 | 210.0 | 130.0 |
| Ave. | 228.8 ± 10.3 | 146.3 ± 32.7 | 229.3 ± 35.4 | 102.5 ± 33.3 |

Based on the stability and curing ate studies, it is clear that the ether and morpholine containing catalysts are the fastest with only very slight increases melt viscosity during heat aging when used in reactive hot melt adhesives.

We claim:

1. A catalyzed polyurethane reactive hot melt adhesive comprising:

a) a reactive polyurethane adhesive and b) 0.05 to 0.15% by weight of 2,2'dimorpholinoethyl ether or di(2,6-dimethylmorpholinoethyl)ether catalyst.

2. The adhesive of claim 1 wherein the catalyst is present in an amount of 0.075 to 0.125% by weight.

3. The adhesive of claim 1 wherein the catalyst is present in an amount of about 0.1% by weight.

4. The adhesive of claim 1 wherein the catalyst is 2,2'dimorpholinoethyl ether.

5. The adhesive of claim 1 wherein the reactive polyurethane adhesive contains residual ethylenic unsaturation.

6. The adhesive of claim 1 wherein the reactive polyurethane adhesive contains a thermoplastic polymer selected from the group consisting of an A-B-A block copolymer, an A-(B-A)$_n$-B block copolymer, and a radial A-B-A block copolymer wherein n is an integer from about 2–50, each A is a polystyrene block and each B is a rubbery block.

7. A method for improving the curing speed of a reactive hot melt adhesive comprising the step of incorporating therein 0.05 to 0.15% by weight of 2,2'dimorpholinodiethyl ether or di(2,6-dimethylmorpholinoethyl)ether catalyst.

8. The method of claim 7 wherein the catalyst is present in an amount of 0.075 to 0.125% by weight.

9. The method of claim 7 wherein the catalyst is present in an amount of about 0.1% by weight.

10. The method of claim 7 wherein the catalyst is 2,2'dimorpholinoethyl ether.

11. The method of claim 7 wherein the reactive polyurethane adhesive contains residual ethylenic unsaturation.

12. The method of claim 7 wherein the reactive polyurethane adhesive contains a thermoplastic polymer selected from the group consisting of an A-B-A block copolymer, an A-(B-A)$_n$-B block copolymer, and a radial A-B-A block copolymer wherein n is an integer from about 2–50, each A is a polystyrene block and each B is a rubbery block.

\* \* \* \* \*